(12) United States Patent
Ogawa

(10) Patent No.: US 11,608,046 B2
(45) Date of Patent: Mar. 21, 2023

(54) HYBRID VEHICLE

(71) Applicant: TOYOTA JIDOSHA KABUSHIKI KAISHA, Aichi-ken (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 94 days.

(21) Appl. No.: 17/405,585

(22) Filed: Aug. 18, 2021

(65) Prior Publication Data

US 2022/0089141 A1 Mar. 24, 2022

(30) Foreign Application Priority Data

Sep. 23, 2020 (JP) .............................. JP2020-158502

(51) Int. Cl.
*B60W 20/12* (2016.01)
*B60K 6/24* (2007.10)
*B60K 6/26* (2007.10)
*B60K 6/28* (2007.10)
*B60K 6/44* (2007.10)

(52) U.S. Cl.
CPC ............... *B60W 20/12* (2016.01); *B60K 6/24* (2013.01); *B60K 6/26* (2013.01); *B60K 6/28* (2013.01); *B60K 6/44* (2013.01)

(58) Field of Classification Search
CPC ......... B60W 20/12; B60W 20/14; B60K 6/24; B60K 6/26; B60K 6/28; B60K 6/44
See application file for complete search history.

(56) References Cited

U.S. PATENT DOCUMENTS

| | | | |
|---|---|---|---|
| 11,524,673 B2 * | 12/2022 | Ogawa ................ | B60W 50/14 |
| 2008/0319597 A1 * | 12/2008 | Yamada ................ | B60K 6/46 |
| | | | 701/22 |
| 2011/0166731 A1 * | 7/2011 | Kristinsson ......... | B60W 10/08 |
| | | | 180/65.265 |
| 2015/0217755 A1 * | 8/2015 | Bryan ................ | B60W 10/26 |
| | | | 701/22 |
| 2016/0137184 A1 * | 5/2016 | Hokoi ................ | B60W 20/40 |
| | | | 180/65.265 |
| 2016/0362098 A1 * | 12/2016 | Ogawa ............. | B60W 50/0097 |
| 2017/0028980 A1 * | 2/2017 | Ogawa ................ | B60W 20/12 |
| 2017/0028981 A1 * | 2/2017 | Ogawa ................ | B60K 6/445 |
| 2017/0043761 A1 * | 2/2017 | Morisaki ............. | B60W 20/40 |
| 2017/0043790 A1 * | 2/2017 | Morisaki ............. | B60W 10/08 |
| 2017/0066429 A1 * | 3/2017 | Ogawa ................ | B60W 10/06 |
| 2017/0282726 A1 * | 10/2017 | Ichikawa .............. | B60L 58/10 |

(Continued)

FOREIGN PATENT DOCUMENTS

| | | |
|---|---|---|
| JP | 2014-151760 A | 8/2014 |
| JP | 2016-097697 A | 5/2016 |

*Primary Examiner* — Jeffrey J Restifo
(74) *Attorney, Agent, or Firm* — Sughrue Mion, PLLC

(57) ABSTRACT

A hybrid vehicle includes an electric motor, a power storage device, an engine, and a controller. The controller executes switching control for switching control modes. The controller adds, to a first traveling distance, a traveling distance that is obtained when a state in which the engine is not operating and a power storage amount of the power storage device is higher than a threshold continues, and adds, to a second traveling distance, a traveling distance that is obtained when a state in which the engine is not operating and a charge depleting mode is selected continues.

10 Claims, 8 Drawing Sheets

(56) References Cited

U.S. PATENT DOCUMENTS

| | | | |
|---|---|---|---|
| 2017/0282906 A1* | 10/2017 | Abe | B60K 6/28 |
| 2017/0287234 A1* | 10/2017 | Hashimoto | G01C 21/3605 |
| 2018/0334157 A1* | 11/2018 | Tanaka | G01C 21/3469 |
| 2019/0092185 A1* | 3/2019 | Ogawa | G01C 21/3469 |
| 2022/0089141 A1* | 3/2022 | Ogawa | B60K 6/24 |
| 2022/0126812 A1* | 4/2022 | Ogawa | B60W 50/082 |
| 2022/0194353 A1* | 6/2022 | Yokoyama | B60W 10/06 |
| 2022/0363238 A1* | 11/2022 | Li | B60K 6/387 |

* cited by examiner

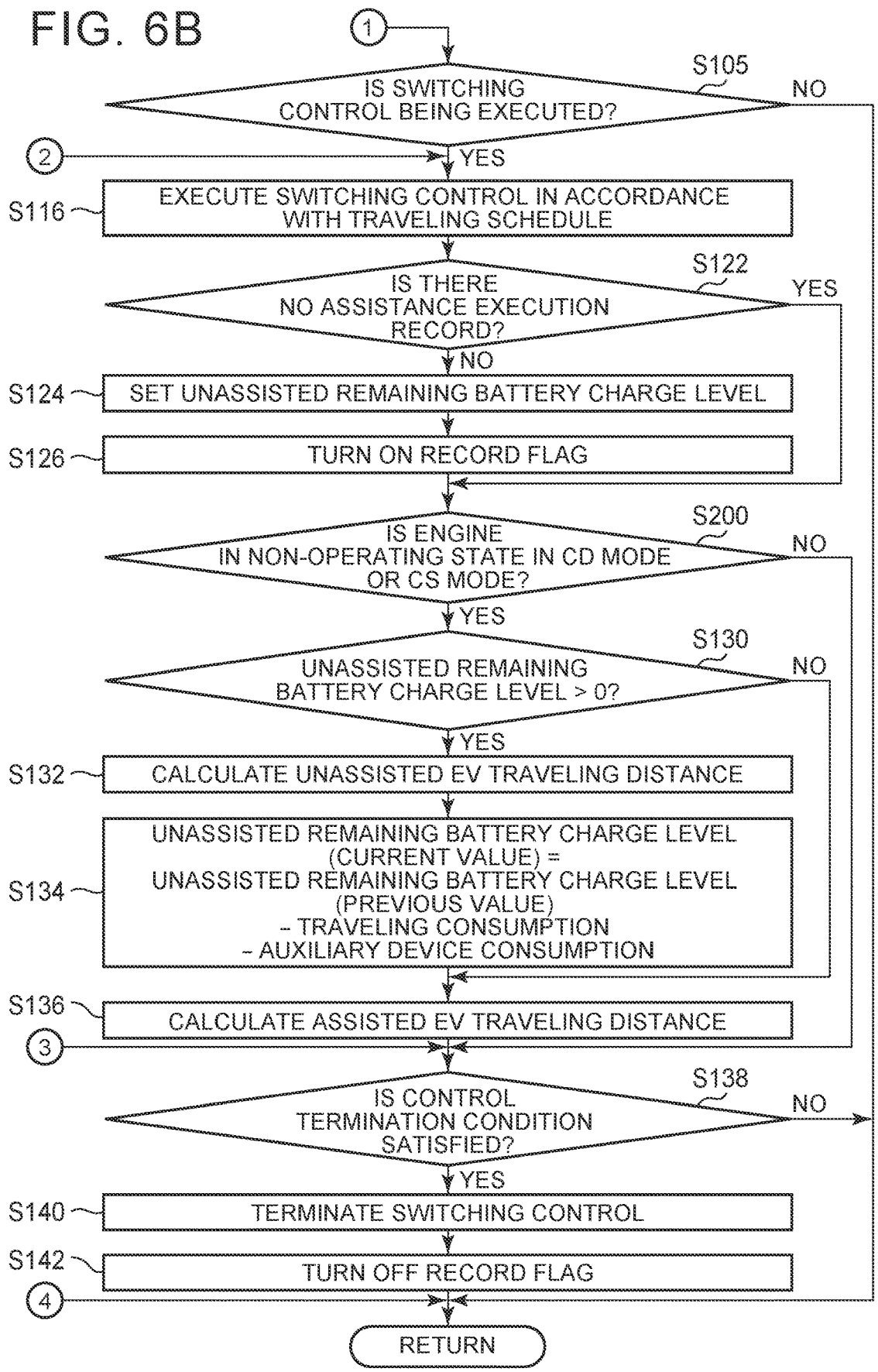

HYBRID VEHICLE

CROSS-REFERENCE TO RELATED APPLICATION

This application claims priority to Japanese Patent Application No. 2020-158502 filed on Sep. 23, 2020, incorporated herein by reference in its entirety.

BACKGROUND

1. Technical Field

The present disclosure relates to control on a hybrid vehicle.

2. Description of Related Art

In a hybrid vehicle including a motor generator serving as a drive source and an engine serving as an electric generator, any one of a plurality of control modes is selected and the vehicle is controlled in the selected control mode. Examples of the control modes include a charge depleting (CD) mode and a charge sustaining (CS) mode. In the CD mode, the vehicle continues to travel through an operation of a motor and electric power stored in an on-board battery is consumed while keeping the engine stopped to the extent possible. In the CS mode, the engine is activated more frequently than the CD mode and the vehicle travels while keeping the remaining charge level of the on-board battery in a predetermined range by using the engine and the motor generator.

When this hybrid vehicle travels toward a destination set by a user, switching control is executed to switch the control modes as appropriate depending on a condition on a traveling route.

For example, Japanese Unexamined Patent Application Publication No. 2014-151760 (JP 2014-151760 A) discloses a technology for setting a traveling route to a destination and selecting an electric vehicle (EV) mode for motor-based traveling or a hybrid vehicle (HV) mode using an engine and a motor generator in each of a plurality of sections on the set traveling route except one or more sections behind the destination.

SUMMARY

In the hybrid vehicle having the configuration described above, the user may be notified about how a traveling distance of the motor-based traveling using the electric power in the on-board battery in a case where the switching control is executed depending on a traveling condition changes as compared to a case where the switching control is not executed. Therefore, it is necessary that the traveling distances of the motor-based traveling using the electric power in the on-board battery in both the cases be calculated with high accuracy based on the remaining charge level of the on-board battery. Even though the CD mode is selected, there is a possibility that the remaining battery charge level does not change when the engine operates. Therefore, there is a possibility that the actual traveling distance of the motor-based traveling using the electric power in the on-board battery in the case where the switching control is executed depending on the traveling condition and the traveling distance of the motor-based traveling using the on-board battery in the case where the switching control is not executed cannot be calculated with high accuracy.

The present disclosure provides a hybrid vehicle in which traveling distances of motor-based traveling using electric power in an on-board battery in a case where switching control is executed depending on a traveling condition and in a case where the switching control is not executed are calculated with high accuracy.

A hybrid vehicle according to one aspect of the present disclosure includes an electric motor, a power storage device, an engine, and a controller. The electric motor is configured to generate a driving force in the hybrid vehicle. The power storage device is configured to supply electric power to the electric motor. The engine is configured to generate electric power for charging the power storage device. The controller is configured to control the engine and the electric motor in any one of a plurality of control modes. The control modes include a charge depleting mode and a charge sustaining mode. The controller is configured to execute switching control for switching the control modes in accordance with a traveling schedule in which the charge depleting mode or the charge sustaining mode is assigned to each of a plurality of sections that constitutes a traveling route to a destination of the hybrid vehicle. The controller is configured to calculate a first traveling distance and a second traveling distance. The first traveling distance is a traveling distance of motor-based traveling using the electric power in the power storage device in a case where the switching control is not executed. The second traveling distance is a traveling distance of the motor-based traveling using the electric power in the power storage device in a case where the switching control is executed. The controller is configured to add, to the first traveling distance, a traveling distance that is obtained when a state in which the engine is not operating and a power storage amount of the power storage device is higher than a threshold continues. The controller is configured to add, to the second traveling distance, a traveling distance that is obtained when a state in which the engine is not operating and the charge depleting mode is selected.

In the hybrid vehicle according to the one aspect of the present disclosure, the first traveling distance of the motor-based traveling using the electric power in the power storage device in the case where the switching control is not executed and the second traveling distance of the motor-based traveling using the electric power in the power storage device in the case where the switching control is executed can be calculated with high accuracy.

In the hybrid vehicle according to the one aspect of the present disclosure, the controller may be configured not to add, to each of the first traveling distance and the second traveling distance, a traveling distance of the motor-based traveling during a period in which the charge depleting mode is selected and the engine is operating.

In the hybrid vehicle according to the one aspect of the present disclosure, the traveling distance of the motor-based traveling when the charge depleting mode is selected and the engine is operating is not added to each of the first traveling distance and the second traveling distance. Thus, the first traveling distance and the second traveling distance can be calculated with high accuracy.

In the hybrid vehicle according to the one aspect of the present disclosure, the controller may be configured to calculate, during execution of the switching control, the power storage amount in the case where the switching control is not executed by using an energy consumption caused by traveling of the hybrid vehicle.

In the hybrid vehicle according to the one aspect of the present disclosure, the power storage amount in the case where the switching control is not executed can be calculated with high accuracy by using the energy consumption caused by traveling of the vehicle.

In the hybrid vehicle according to the one aspect of the present disclosure, the controller may be configured to calculate, during execution of the switching control, the power storage amount in the case where the switching control is not executed by using an energy consumption caused by traveling of the hybrid vehicle and an energy consumption caused by operation of an auxiliary device of the hybrid vehicle.

In the hybrid vehicle according to the one aspect of the present disclosure, the power storage amount in the case where the switching control is not executed can be calculated with high accuracy by using the energy consumption caused by operation of the auxiliary device of the vehicle in addition to the energy consumption caused by traveling of the vehicle.

In the hybrid vehicle according to the one aspect of the present disclosure, the controller may be configured to calculate the power storage amount in the case where the switching control is not executed by setting a maximum value of output energy of the electric motor as a maximum value of an energy consumption caused by traveling of the hybrid vehicle.

In the hybrid vehicle according to the one aspect of the present disclosure, the power storage amount in the case where the switching control is not executed can be calculated with high accuracy by setting the maximum value of the output energy of the electric motor as the maximum value of the energy consumption caused by traveling of the vehicle.

In the hybrid vehicle according to the one aspect of the present disclosure, the controller may be configured to notify, by using a notifier, a user about information related to the second traveling distance.

In the hybrid vehicle according to the one aspect of the present disclosure, the user is notified about the information related to the second traveling distance. Thus, the user can recognize an effect of the execution of the switching control.

In the hybrid vehicle according to the one aspect of the present disclosure, the information related to the second traveling distance may include information related to a difference between the first traveling distance and the second traveling distance.

In the hybrid vehicle according to the one aspect of the present disclosure, the user is notified about the information related to the difference between the first traveling distance and the second traveling distance. Thus, the user can recognize the effect of the execution of the switching control.

In the hybrid vehicle according to the one aspect of the present disclosure, the notifier may include at least one of a display provided in the hybrid vehicle and a display of a mobile terminal.

In the hybrid vehicle according to the one aspect of the present disclosure, the user can recognize the effect of the execution of the switching control by using the display provided in the vehicle or the display of the mobile terminal.

The hybrid vehicle according to the one aspect of the present disclosure may further include a communicator configured to communicate with a server outside the hybrid vehicle. The controller may be configured to transmit information related to the first traveling distance and the second traveling distance to the server by using the communicator.

In the hybrid vehicle according to the one aspect of the present disclosure, the information related to the first traveling distance and the second traveling distance is transmitted to the server by using the communicator. Thus, the server can acquire information indicating the effect of the execution of the switching control in the vehicle.

In the hybrid vehicle according to the one aspect of the present disclosure, the controller may be configured to add, to the first traveling distance, the traveling distance that is obtained when the state in which the engine is not operating and the power storage amount of the power storage device is higher than the threshold while the charge depleting mode is selected continues.

In the hybrid vehicle according to the one aspect of the present disclosure, the traveling distance that is obtained when the state in which the engine is not operating and the power storage amount of the power storage device is higher than the threshold while the charge depleting mode is selected continues is added to the first traveling distance. Thus, the first traveling distance of the motor-based traveling using the electric power in the power storage device in the case where the switching control is not executed can be calculated with high accuracy.

According to the one aspect of the present disclosure, it is possible to provide the hybrid vehicle in which the traveling distances of the motor-based traveling using the electric power in the on-board battery in the case where the switching control is executed depending on the traveling condition and in the case where the switching control is not executed are calculated with high accuracy.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 6B is a flowchart illustrating an example of processes to be executed by an HV-ECU in the modified example.

DETAILED DESCRIPTION OF EMBODIMENTS

Figure 1:
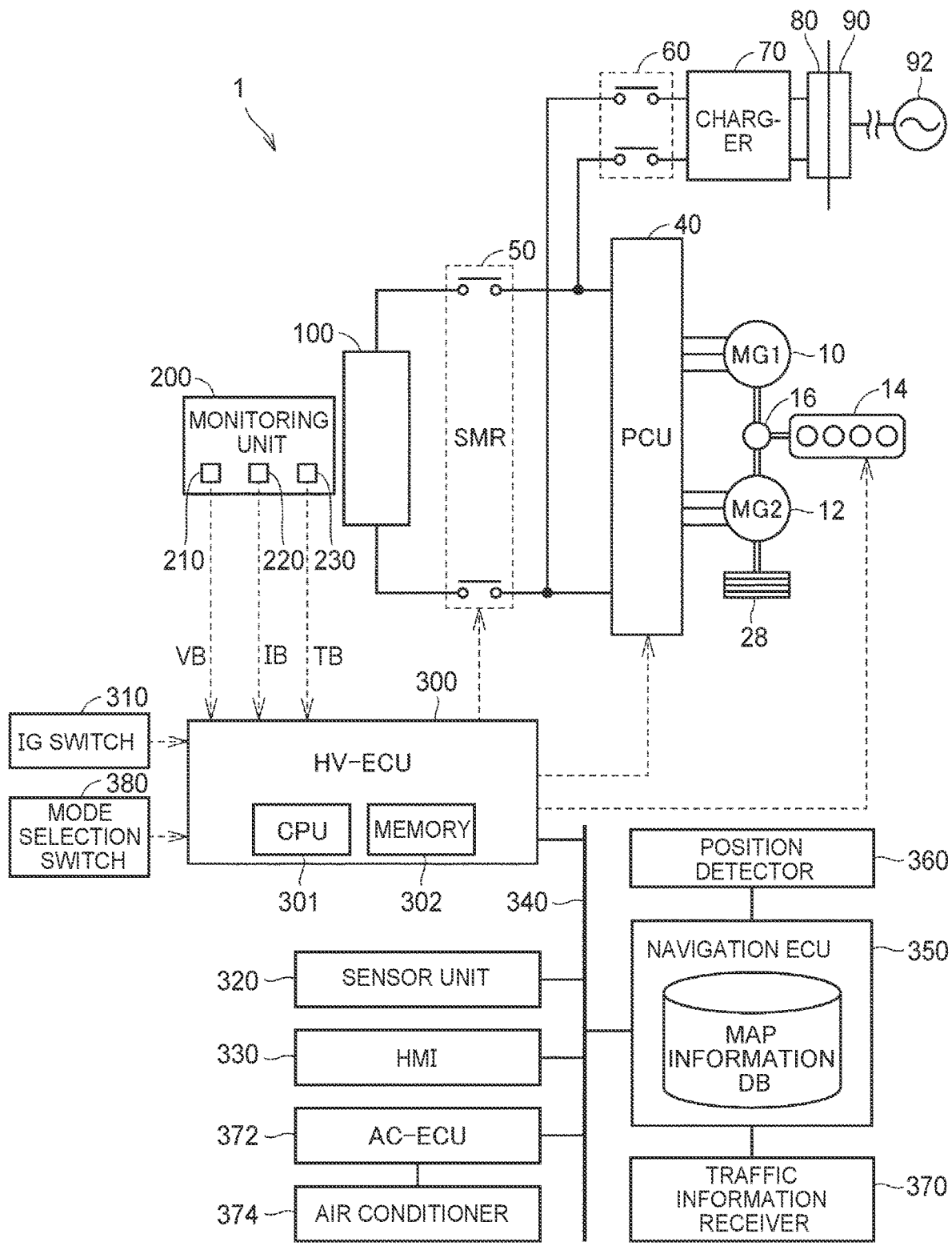
FIG. 1 is a diagram illustrating an example of the configuration of a hybrid vehicle.

An embodiment of the present disclosure is described below in detail with reference to the drawings. In the drawings, the same or corresponding parts are represented by the same reference symbols to omit repetitive description.

An example of the configuration of a hybrid vehicle according to the embodiment of the present disclosure is described below. FIG. 1 is a diagram illustrating an example of the configuration of a hybrid vehicle 1 (hereinafter referred to as "vehicle 1"). Examples of the vehicle 1 include a series-parallel hybrid vehicle.

As illustrated in FIG. 1, the vehicle 1 includes a first motor generator (hereinafter referred to as "first MG") 10, a second motor generator (hereinafter referred to as "second MG") 12, an engine 14, a power split device 16, driving wheels 28, a power control unit (PCU) 40, a system main relay (SMR) 50, a charging relay 60, a charger 70, an inlet 80, a power storage device 100, a monitoring unit 200, an HV electronic control unit (ECU) 300, an ignition (IG) switch 310, a sensor unit 320, a human machine interface (HMI) 330, a navigation ECU 350, a position detector 360, a traffic information receiver 370, an air conditioner ECU (hereinafter referred to as "AC-ECU") 372, an air conditioner 374, and a mode selection switch 380. The HV-ECU 300 is an example of a controller.

Each of the first MG 10 and the second MG 12 is a three-phase alternating current (AC) rotating electrical machine such as a permanent magnet synchronous motor including a rotor having embedded permanent magnets. Each of the first MG 10 and the second MG 12 has functions of an electric motor (motor) and an electric generator (generator). The first MG 10 and the second MG 12 are connected to the power storage device 100 via the PCU 40.

For example, the first MG 10 is driven by an inverter in the PCU 40 and rotates an output shaft of the engine 14 to start the engine 14. The first MG 10 generates electric power by receiving power of the engine 14. The electric power generated by the first MG 10 is stored in the power storage device 100 via the PCU 40.

For example, the second MG 12 is driven by the inverter in the PCU 40 while the vehicle 1 is traveling. Power of the second MG 12 is transmitted to the driving wheels 28 via power transmission gears (not illustrated) such as a differential gear and a speed reducing gear. For example, while the vehicle 1 is braking, the second MG 12 is driven by the driving wheels 28 and operates as the electric generator to execute regenerative braking. Electric power generated by the second MG 12 is stored in the power storage device 100 via the PCU 40.

The engine 14 is a publicly known internal combustion engine configured to output power by burning fuel of a gasoline engine or a diesel engine (gasoline or light oil). Operating conditions of the engine 14 such as a throttle opening degree (intake amount), a fuel supply amount, and an ignition timing are electrically controllable by the HV-ECU 300. For example, the HV-ECU 300 controls a fuel injection amount, an ignition timing, and an intake air amount of the engine 14 to cause the engine 14 to operate at a target rotation speed and a target torque set based on conditions of the vehicle 1.

The power split device 16 splits a path of the power of the engine 14 into a path along which the power is transmitted to the driving wheels 28 and a path along which the power is transmitted to the first MG 10. For example, the power split device 16 is a planetary gearing mechanism including a sun gear, a ring gear, pinion gears, and a carrier.

The PCU 40 is a power converter configured to convert electric power between the power storage device 100 and the first MG 10 or between the power storage device 100 and the second MG 12 based on a control signal from the HV-ECU 300. The PCU 40 includes an inverter and a converter (both of which are not illustrated). The inverter drives the first MG 10 or the second MG 12 by converting direct current (DC) power from the power storage device 100 into AC power. The converter adjusts a voltage level of the DC power to be supplied from the power storage device 100 to the inverter.

The SMR 50 is electrically connected between the power storage device 100 and the PCU 40. The SMR 50 is closed or opened under control based on a control signal from the HV-ECU 300.

The power storage device 100 is a rechargeable DC power supply, which is a secondary battery such as a nickel-metal hydride battery or a lithium ion battery containing a solid or liquid electrolyte. The power storage device 100 may be a capacitor such as an electric double layer capacitor. The power storage device 100 supplies the PCU 40 with electric power for generating a traveling drive force of the vehicle 1. The power storage device 100 is charged with electric power generated through a power generating operation using the first MG 10 and the engine 14 or through regenerative braking in the second MG 12, and is discharged through a driving operation of the first MG 10 or the second MG 12.

The monitoring unit 200 monitors conditions of the power storage device 100. For example, the monitoring unit 200 includes a voltage detector 210, a current detector 220, and a temperature detector 230. The voltage detector 210 detects a voltage VB between terminals of the power storage device 100. The current detector 220 detects a current IB input to or output from the power storage device 100. The temperature detector 230 detects a temperature TB of the power storage device 100. The detectors output detection results to the HV-ECU 300.

The charging relay 60 is electrically connected between the SMR 50 and the charger 70. The charging relay 60 is closed or opened under control based on a control signal from the HV-ECU 300.

The charger 70 is electrically connected between the charging relay 60 and the inlet 80. Examples of the charger 70 include an AC/DC converter (inverter). The charger 70 converts AC power supplied from an external power supply 92 via a connector 90 described later and the inlet 80 into DC power, and outputs the DC power to the charging relay 60. The charger 70 is controlled based on a control signal from the HV-ECU 300.

The operation of the charger 70 is not particularly limited to the AC/DC conversion. When DC power is supplied from the inlet 80 to the charger 70, the charger 70 may operate as a DC/DC converter.

The connector 90 is insertable into the inlet 80 along with mechanical coupling such as fitting. Along with the insertion of the connector 90 into the inlet 80, electrical connection between the vehicle 1 and the external power supply 92 is secured.

The HV-ECU 300 includes a central processing unit (CPU) 301 and a memory (including a read only memory (ROM) and a random access memory (RAM)) 302. The HV-ECU 300 controls the devices in the vehicle 1 (such as the engine 14, the PCU 40, the SMR 50, the charging relay 60, the charger 70, and the HMI 330) to achieve a desired state of the vehicle 1 based on signals from the monitoring unit 200, the IG switch 310, the sensor unit 320, and the mode selection switch 380 and information such as maps and programs stored in the memory 302. Various types of control to be executed by the HV-ECU 300 may be processed not only by software but also by dedicated hardware (electronic circuit).

For example, during driving of the vehicle 1, the HV-ECU 300 calculates a state of charge (SOC) indicating the remaining charge level of the power storage device 100 by using detection results from the monitoring unit 200. The SOC is a percentage of the ratio of a current power storage amount of the power storage device 100 to a full-charge power storage amount. Various publicly known methods such as summation of current values (Coulomb-counting) and estimation of an open circuit voltage (OCV) may be employed as an SOC calculation method.

The HV-ECU 300 is connected to the sensor unit 320, the HMI 330, and the navigation ECU 350 via a communication bus 340. The position detector 360 and the traffic information receiver 370 are connected to the navigation ECU 350.

For example, the sensor unit 320 includes an accelerator pedal sensor, a vehicle speed sensor, and a brake pedal sensor. The accelerator pedal sensor detects an operation amount of an accelerator pedal operated by a user. The vehicle speed sensor detects a vehicle speed of the vehicle 1. The brake pedal sensor detects an operation amount of a brake pedal operated by the user. The sensors output detection results to the HV-ECU 300.

The HMI 330 provides the user with information for assisting driving of the vehicle 1. For example, the HMI 330 is a touch panel display provided in a cabin of the vehicle 1, including a loudspeaker. For example, the HMI 330 provides (notifies) the user with (about) various types of information by outputting visual information (graphical information and text information) and audio information (voice information and sound information).

The HMI 330 functions as a display to receive a current position of the vehicle 1 and map information and traffic jam information on an area around the current position from the navigation ECU 350 via the communication bus 340 and display the current position of the vehicle 1 together with the map information and the traffic jam information on the area around the current position.

The HMI 330 also functions as a touch panel operable by the user. The user touches the touch panel to change a scale of a displayed map or input a destination of the vehicle 1. When the destination is input to the HMI 330, information on the destination is transmitted to the navigation ECU 350 via the communication bus 340.

The devices connected to the communication bus 340 may communicate with each other through controller area network (CAN) communication via the communication bus 340 or through wireless communication in place of or in addition to the communication bus 340.

The navigation ECU 350 includes a CPU and a memory (both of which are not illustrated). The memory has a map information database (DB). The navigation ECU 350 outputs a current position of the vehicle 1 and map information and traffic jam information on an area around the current position to the HMI 330 and the HV-ECU 300 based on various types of information stored in the map information DB, various types of information detected by the position detector 360, and various types of information received from the traffic information receiver 370.

At every predetermined timing (for example, every time interval of several tens of seconds), the navigation ECU 350 outputs, to the HV-ECU 300, map information and road traffic information on a traveling route from a current position of the vehicle 1 to a destination (hereinafter referred to collectively as "preview information").

The map information DB stores map information. The map information contains data related to "nodes" indicating, for example, an intersection and a dead end, "links" connecting the nodes, and "facilities" (building and parking area) along the links. The map information also contains positional information on each node, distance information on each link, road category information (information on a downtown, an expressway, or an ordinary road) on each link, and gradient information on each link. The map information is not limited to information acquired by being read from the map information DB, and may be information sequentially acquired through communication with an external database in addition to or in place of the information acquired from the map information DB.

For example, the position detector 360 acquires a current position of the vehicle 1 based on a signal (radio wave) from a Global Positioning System (GPS) satellite, and outputs a signal indicating the current position of the vehicle 1 to the navigation ECU 350. The method for acquiring the current position of the vehicle 1 may be a method that involves acquiring the current position by using a position detecting satellite other than the GPS satellite, or a method that involves acquiring the current position by exchanging predetermined information with an access point of a cellular base station or a wireless local area network (LAN).

The traffic information receiver 370 receives predetermined road traffic information. Examples of the predetermined road traffic information include road traffic information provided by frequency modulation (FM) multiplex broadcasting, and road traffic information collected from a probe vehicle or a probe center. The road traffic information contains at least traffic jam information, and may also contain traffic control information or parking information. For example, the road traffic information is updated at intervals of several minutes.

The AC-ECU 372 controls operations of the air conditioner 374 described later. The AC-ECU 372 includes a CPU and a memory (both of which are not illustrated). The AC-ECU 372 can acquire information related to operating conditions of the air conditioner 374 (for example, information on energy consumption), and transmit the information to the HV-ECU 300. For example, the AC-ECU 372 can generate a control command value for the air conditioner 374 with its target value being a set temperature in the cabin of the vehicle 1, and transmit the control command value to the air conditioner 374 as a control signal.

The air conditioner 374 discharges air whose temperature is adjusted from an air outlet in the vehicle 1 by using electric devices such as a compressor configured to adjust the temperature in the cabin of the vehicle 1.

The mode selection switch 380 can select any one of a plurality of control modes. The control modes are described later. In response to a user's operation, the mode selection switch 380 transmits, to the HV-ECU 300, a signal indicating that the mode selection switch 380 is operated.

In this embodiment, the vehicle 1 is controlled by the HV-ECU 300 in any one of the control modes. The control modes include a charge depleting (CD) mode and a charge sustaining (CS) mode. The CD mode is a control mode in which the vehicle 1 continues to travel through an operation of the motor using electric power discharged from the power storage device 100 and therefore the electric power stored in the power storage device 100 is consumed while keeping the engine 14 stopped to the extent possible. The CS mode is a control mode in which the engine 14 is activated more frequently than the CD mode and the vehicle 1 travels while keeping the remaining charge level (SOC) of the power storage device 100 in a predetermined range by charging and discharging the power storage device 100 using the engine 14, the first MG 10, and the second MG 12.

For example, when the CD mode or the CS mode is set as the control mode, the HV-ECU 300 controls the engine 14, the first MG 10, and the second MG 12 in the set control mode. The HV-ECU 300 stores information on the set control mode in the memory 302. The HV-ECU 300 can acquire the selected control mode by reading the information from the memory 302.

For example, when no traveling route is set (that is, no destination is set), the HV-ECU 300 controls the engine 14, the first MG 10, and the second MG 12 in the CD mode until the SOC of the power storage device 100 reaches a value smaller than a predetermined value. That is, the HV-ECU 300 executes motor-based traveling by using the second MG 12 while keeping the engine 14 stopped. For example, when a driving force required in the vehicle 1 increases through an increase in a depression amount of the accelerator pedal though the CD mode is selected, the HV-ECU 300 starts the engine 14 by using the first MG 10, and causes the vehicle 1 to travel by using the engine 14 and the second MG 12. For example, when electric power required in the vehicle 1 increases through operations of auxiliary devices of the vehicle 1 such as various electric devices including the air conditioner, various cooling fans, and the converters, the HV-ECU 300 may start the engine 14 by using the first MG 10.

When the SOC of the power storage device 100 is smaller than the predetermined value, the HV-ECU 300 switches the CD mode to the CS mode, and controls the engine 14, the first MG 10, and the second MG 12 in the CS mode. That is, the HV-ECU 300 causes the vehicle 1 to travel by using the second MG 12 while generating electric power by using the first MG 10 with the power of the engine 14 so that the SOC of the power storage device 100 falls within the predetermined range. For example, when the SOC of the power storage device 100 exceeds the upper limit of the predetermined range though the CS mode is selected, the HV-ECU 300 may execute the motor-based traveling by using the second MG 12 while keeping the engine 14 stopped.

For example, when the mode selection switch 380 is operated to request the CS mode, the HV-ECU 300 sets the CS mode as the control mode. For example, when the mode selection switch 380 is operated to request the CD mode, the HV-ECU 300 sets the CD mode as the control mode under a condition that the SOC of the power storage device 100 is equal to or larger than the predetermined value. When the CD mode is selected by operating the mode selection switch 380 but the SOC of the power storage device 100 is smaller than the predetermined value, the HV-ECU 300 switches the CD mode to the CS mode.

When a traveling route is set (a destination is set), the HV-ECU 300 executes traveling assistance control for switching the CD mode and the CS mode in accordance with a traveling schedule.

Specifically, when a destination is set, the HV-ECU 300 sets a traveling route from a current position of the vehicle 1 to the destination. For example, the HV-ECU 300 sets a traveling route that satisfies conditions such as a traveling distance, whether to use an expressway, and whether a traffic jam occurs. When the traveling route is set, the HV-ECU 300 divides the traveling route from the current position of the vehicle 1 to the destination into a plurality of traveling sections, and sets a traveling schedule by assigning the CD mode or the CS mode to each of the traveling sections. In this embodiment, the HV-ECU 300 divides the traveling route into the traveling sections by, for example, setting the nodes on the traveling route as division points of the traveling sections and setting the links as the traveling sections.

The HV-ECU 300 acquires preview information updated by the navigation ECU 350, and calculates energy consumptions En in the traveling sections on the traveling route based on the acquired preview information. For example, the HV-ECU 300 calculates the energy consumptions En in the traveling sections by using gradient information and road category information, information on a speed limit related to the vehicle speed, information on whether a traffic jam occurs, or a traveling distance, contained in the preview information. For example, the HV-ECU 300 may calculate the energy consumptions En by using a vehicle weight based on the number of occupants of the vehicle 1 in addition to the preview information. For example, the energy consumption En indicates energy required for the vehicle 1 to travel through the target traveling section at a vehicle speed corresponding to a speed limit or to a speed during a traffic jam.

For example, the HV-ECU 300 assigns the CD mode or the CS mode to each of the traveling sections so that the SOC of the power storage device 100 falls within a predetermined range when the vehicle 1 arrives at the destination. For example, the predetermined range is a range of the SOC in which determination can be made that the electric power in the power storage device 100 is used up. For example, an upper limit value of the predetermined range may be a threshold of the SOC for switching the CD mode to the CS mode, a predetermined value higher than the threshold, or a predetermined value lower than the threshold. For example, a lower limit value of the predetermined range is a predetermined value that is set not to accelerate deterioration of the power storage device 100.

For example, the HV-ECU 300 assigns the CD mode to each of the traveling sections when a sum Esum of the energy consumptions En in the traveling sections (hereinafter referred to as "total energy consumption") is smaller than energy corresponding to electric energy required until a current SOC of the power storage device 100 falls within the predetermined range (hereinafter referred to as "remaining energy Er"). The threshold is a predicted value within the predetermined range of the SOC when the vehicle 1 arrives at the destination.

When the total energy consumption Esum is larger than the remaining energy Er, the HV-ECU 300 assigns the CD mode to at least one of the traveling sections with priority, and assigns the CS mode to any traveling section to which the CD mode is not assigned.

For example, the HV-ECU 300 designates, as CD mode priority sections, traveling sections to which the CD mode may be assigned with priority among the plurality of traveling sections, and assigns the CD mode to the designated traveling sections. The CD mode priority section includes a traveling section such as a downtown, a residential area, or a minor street that requires reduction of traveling noise to a relatively low level. Information on whether the traveling section is the downtown, the residential area, or the minor street is prestored in the map information DB.

After the CD mode is assigned to the CD mode priority sections, the HV-ECU 300 assigns the CD mode to other traveling sections in ascending order of the energy consumption En, and accumulates the energy consumptions in the assigned traveling sections. The HV-ECU 300 assigns the CD mode to the traveling sections until a value obtained by adding the sum of the energy consumptions in the traveling sections corresponding to the CD mode priority sections and the accumulated energy consumptions (sum of the energy consumptions in the CD mode) reaches a value larger than the remaining energy Er. When the sum of the energy consumptions in the CD mode is larger than the remaining energy Er, the HV-ECU 300 stops assigning the CD mode, and assigns the CS mode to any traveling section to which the CD mode is not assigned.

By assigning the control modes to the traveling sections in this manner, the SOC of the power storage device 100 can fall within the predetermined range when the vehicle 1 arrives at the destination. After the traveling schedule is set, the HV-ECU 300 executes switching control for switching the control modes in accordance with the set traveling schedule. Therefore, when the vehicle 1 passes through a node on the traveling route after the driving of the vehicle 1 is started, the HV-ECU 300 switches the control mode to a control mode set to a traveling section after node passage.

In the vehicle 1 having the configuration described above, the user may be notified about how a traveling distance of the motor-based traveling using the electric power in the power storage device 100 that is an on-board battery in a case where the switching control is executed to switch the control modes as appropriate in accordance with the traveling schedule changes as compared to a case where the switching control is not executed in accordance with the traveling schedule.

Figure 2:
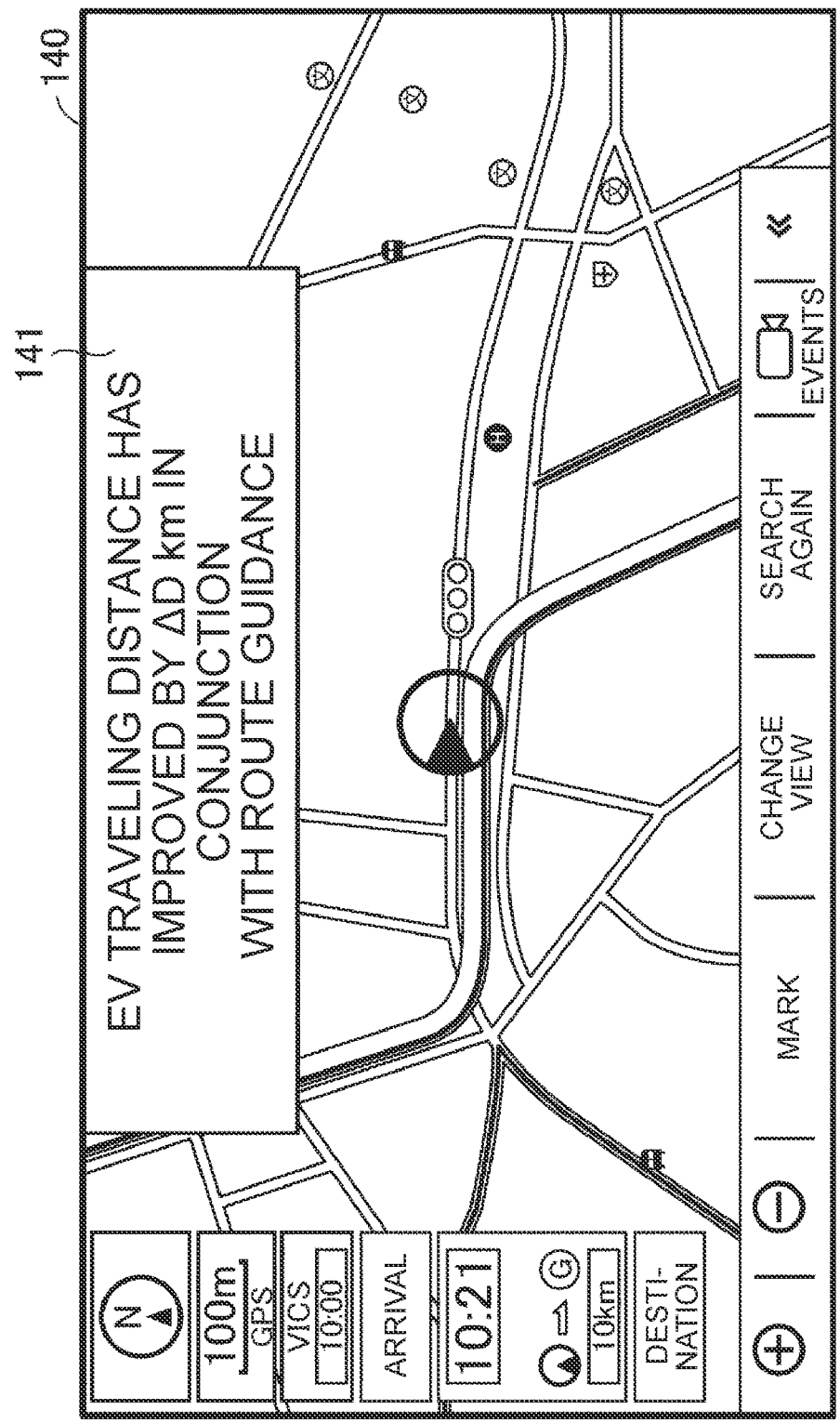
FIG. 2 is a diagram illustrating a display example in which a user is notified about an effect of execution of control for switching control modes as appropriate in accordance with a traveling schedule.

FIG. 2 is a diagram illustrating a display example in which the user is notified about an effect of execution of the control for switching the control modes as appropriate in accordance with the traveling schedule.

For example, when the vehicle 1 is traveling or arrives at the destination, the HV-ECU 300 causes the display of the HMI 330 to display information indicating the degree of improvement in the traveling distance of the motor-based traveling using the electric power in the power storage device 100 as the effect of the execution of the control for switching the control modes as appropriate in accordance with the traveling schedule. FIG. 2 illustrates an example in which a navigation screen displays text information indicating that the traveling distance of the motor-based traveling using the electric power in the power storage device 100 is improved by ΔD km by linking the control modes to route guidance (that is, by executing the control for switching the control modes as appropriate in accordance with the traveling schedule). By displaying the text information on the HMI 330, the user can recognize the effect of the execution of the control for switching the control modes as appropriate in accordance with the traveling schedule. To notify the user about such information, it is necessary that the traveling distances in both the cases where the switching control is executed and where the switching control is not executed be calculated with high accuracy based on, for example, the SOC of the power storage device 100 that indicates the remaining battery charge level.

Even though the CD mode is selected, there is a possibility that the SOC of the power storage device 100 does not change when the engine 14 operates. Therefore, there is a possibility that the actual traveling distance of the motor-based traveling using the electric power in the power storage device 100 in the case where the switching control is executed in accordance with the traveling schedule and an estimated value of the traveling distance of the motor-based traveling in the CD mode using the electric power in the power storage device 100 in the case where the switching control is not executed cannot be calculated with high accuracy.

In this embodiment, the HV-ECU 300 operates as follows. That is, the HV-ECU 300 calculates a first traveling distance of the motor-based traveling using the electric power in the power storage device 100 in the case where the switching control is not executed and a second traveling distance of the motor-based traveling using the electric power in the power storage device 100 in the case where the switching control is executed. The HV-ECU 300 adds, to the first traveling distance, a traveling distance that is obtained when a state in which the engine 14 is not operating and the SOC of the power storage device 100 is higher than the threshold continues. The HV-ECU 300 adds, to the second traveling distance, a traveling distance that is obtained when a state in which the engine 14 is not operating and the CD mode is selected continues.

Thus, the first traveling distance of the motor-based traveling using the electric power in the power storage device 100 in the case where the switching control is not executed and the second traveling distance of the motor-based traveling using the electric power in the power storage device in the case where the switching control is executed can be calculated with high accuracy. In the following description, the first traveling distance is referred to as "unassisted EV traveling distance", and the second traveling distance is referred to as "assisted EV traveling distance".

The HV-ECU 300 does not add, to each of the first traveling distance and the second traveling distance, a traveling distance of the motor-based traveling during a period in which the CD mode is selected and the engine 14 is operating.

Figure 3A:
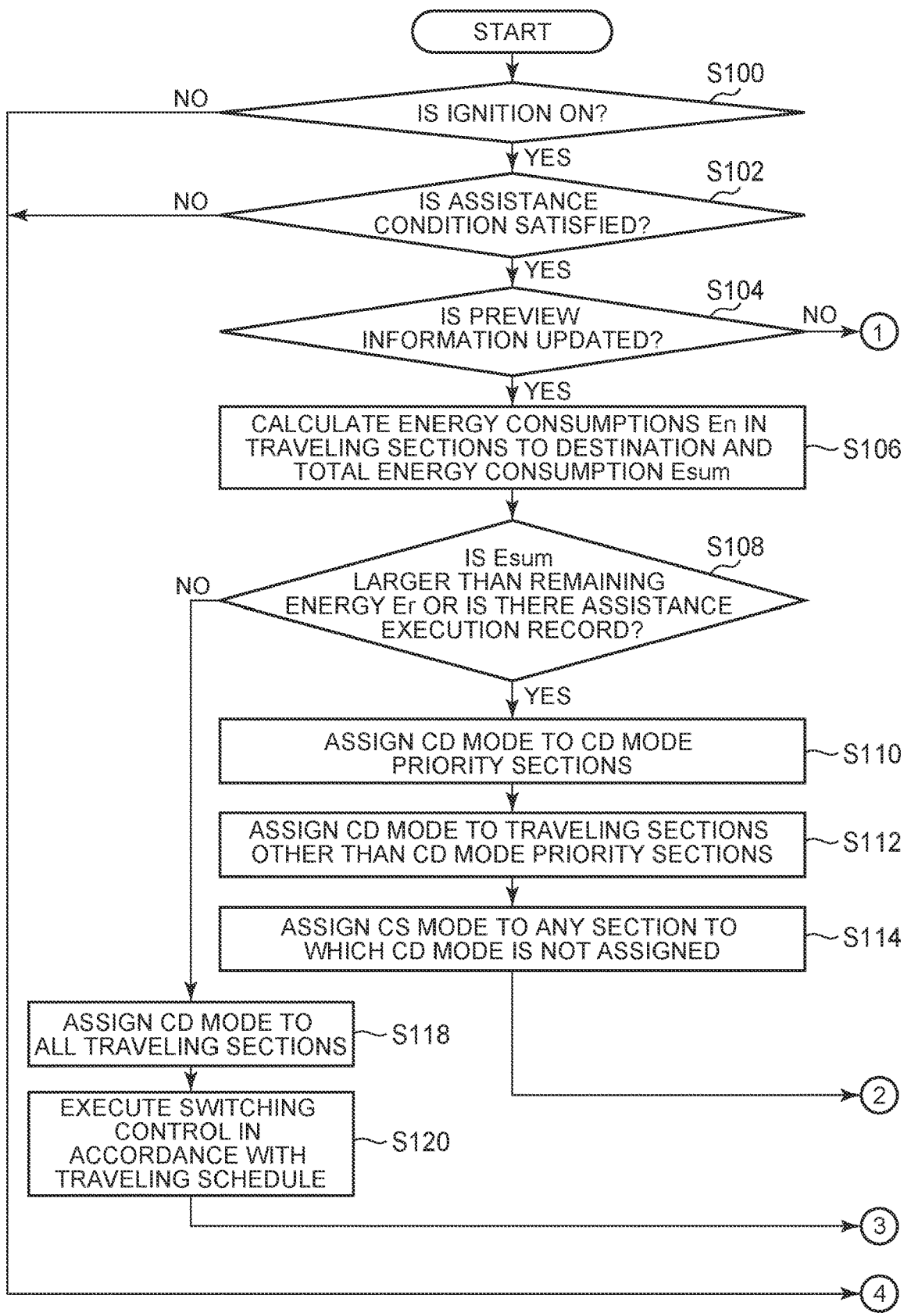
FIG. 3A is a flowchart illustrating an example of processes to be executed by an HV electronic control unit (ECU)
Figure 3B:
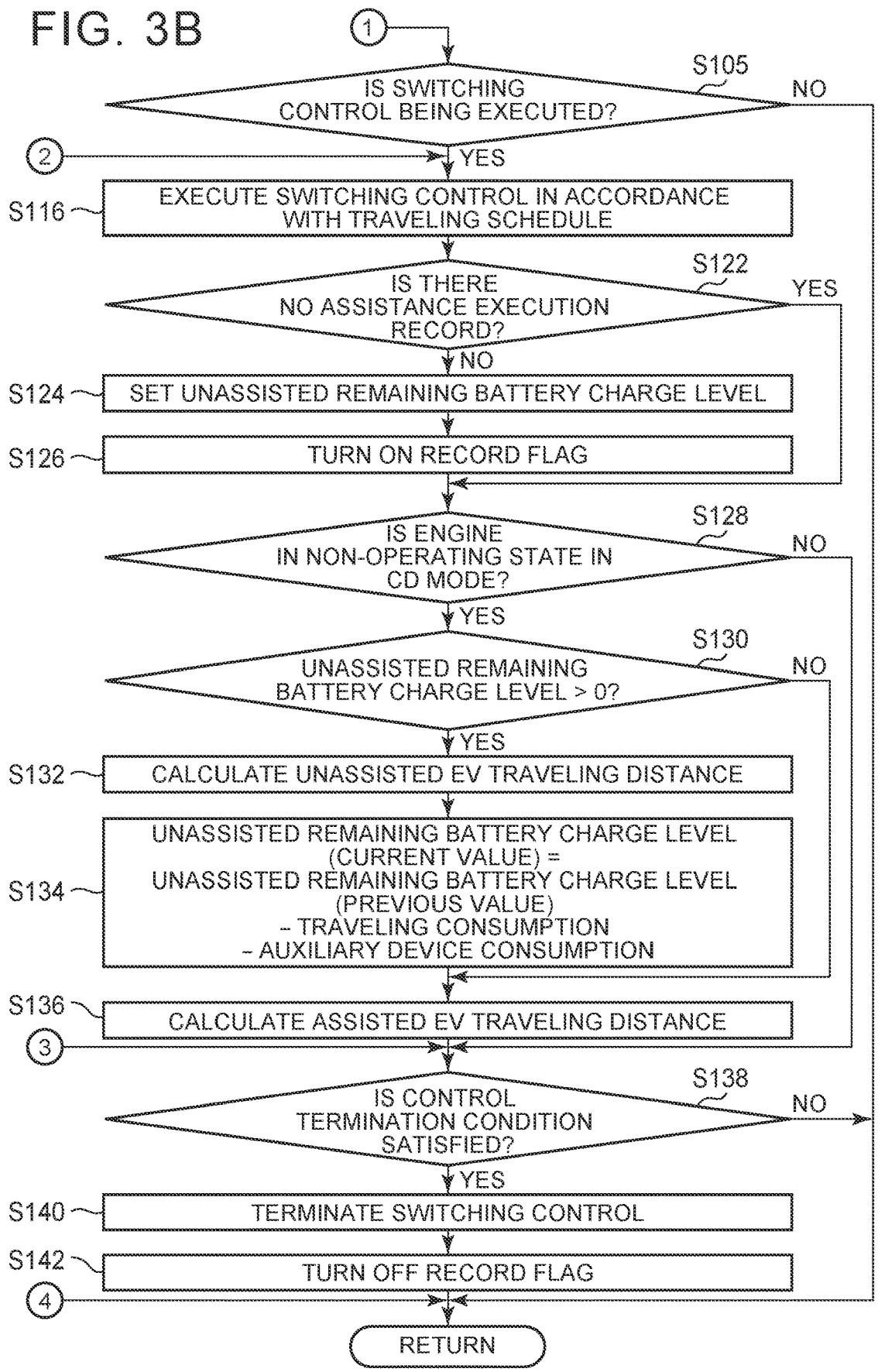
FIG. 3B is a flowchart illustrating an example of processes to be executed by an HV electronic control unit (ECU)

An example of control processes to be executed by the HV-ECU 300 is described below with reference to FIGS. 3A and 3B. FIGS. 3A and 3B are flowcharts illustrating the example of the processes to be executed by the HV-ECU 300. A series of processes in this flowchart is repeatedly executed by the HV-ECU 300 in every predetermined control period.

In Step ("Step" is hereinafter represented by "S") 100, the HV-ECU 300 determines whether ignition is ON. For example, when the user performs an operation of activating the system of the vehicle 1 and the IG switch 310 is turned ON, the HV-ECU 300 turns ON an IG flag. The HV-ECU 300 determines that the ignition is ON when the IG flag is ON. Alternatively, the HV-ECU 300 may determine that the ignition is ON, for example, when the SMR 50 is closed. When the HV-ECU 300 determines that the ignition is ON ("YES" in S100), the processes proceed to S102. When the HV-ECU 300 determines that the ignition is not ON ("NO" in S100), the processes are terminated.

In S102, the HV-ECU 300 determines whether an assistance condition is satisfied. Examples of the assistance condition include a condition that a destination is set and a traveling route to the destination is set. In addition to this condition, the assistance condition may include at least one of a condition that the system of the vehicle 1 has no abnormality, a condition that the vehicle 1 is traveling along the traveling route, and a condition that the SOC of the power storage device is higher than the threshold. When the HV-ECU 300 determines that the assistance condition is satisfied ("YES" in S102), the processes proceed to S104. When the HV-ECU 300 determines that the assistance condition is not satisfied ("NO" in S102), the processes are terminated.

In S104, the HV-ECU 300 determines whether preview information received from the navigation ECU 350 is updated. For example, the HV-ECU 300 determines that the preview information is updated when various types of information such as the predetermined road traffic information related to the preview information are received. When the HV-ECU 300 determines that the preview information is updated ("YES" in S104), the processes proceed to S106.

When the HV-ECU 300 determines that the preview information is not updated ("NO" in S104), the processes proceed to S105.

In S105, the HV-ECU 300 determines whether the switching control is being executed in accordance with a traveling schedule. For example, the HV-ECU 300 may determine that the switching control is being executed in accordance with the traveling schedule when a flag indicating that the switching control is being executed in accordance with the traveling schedule is ON. When the HV-ECU 300 determines that the switching control is being executed in accordance with the traveling schedule ("YES" in S105), the processes proceed to S116. When the HV-ECU 300 determines that the switching control is not being executed in accordance with the traveling schedule ("NO" in S105), the processes are terminated.

In S106, the HV-ECU 300 calculates energy consumptions En in traveling sections based on, for example, gradient information, road category information, and road traffic information in each traveling section in the preview information. Since the calculation method is described above, details of the method are not described again. The HV-ECU 300 calculates the total (sum) of the energy consumptions En in the traveling sections as a total energy consumption Esum.

In S108, the HV-ECU 300 determines whether at least one of the following conditions is satisfied. The first condition is that the total energy consumption Esum is larger than remaining energy Er in the power storage device 100. The second condition is that record information indicating that the switching control has been executed in accordance with the traveling schedule (hereinafter referred to as "assistance execution record") is stored in the memory 302 (hereinafter referred to as "condition that assistance execution record is present"). Since the remaining energy Er is described above, details of the remaining energy Er are not described again. For example, the HV-ECU 300 determines that the condition that the assistance execution record is present is satisfied when a flag associated with the assistance execution record (hereinafter referred to as "record flag") is ON. When the HV-ECU 300 determines that at least one of the condition that the total energy consumption Esum is larger than the remaining energy Er and the condition that the assistance execution record is present is satisfied ("YES" in S108), the processes proceed to S110. When the HV-ECU 300 determines that the total energy consumption Esum is equal to or smaller than the remaining energy Er and the assistance execution record is not present ("NO" in S108), the processes proceed to S118.

In S110, the HV-ECU 300 assigns the CD mode to traveling sections designated as the CD mode priority sections. For example, the CD mode priority section is preset based on a category indicated by the road category information in the preview information (information on a downtown, an expressway, an ordinary road, or the like). For example, a traveling section including a downtown or a minor street is prestored in the HV-ECU 300 or the navigation ECU 350 as the CD mode priority section, or a traveling section corresponding to the CD mode priority section is received as the road traffic information. When the HV-ECU 300 assigns the CD mode to the traveling sections designated as the CD mode priority sections, the processes proceed to S112.

In S112, the HV-ECU 300 assigns the CD mode to traveling sections other than the CD mode priority sections. The HV-ECU 300 sorts traveling sections that are not designated as the CD mode priority sections in ascending order of the energy consumption En, and assigns the CD mode to the sorted traveling sections in the ascending order of the energy consumption En. The HV-ECU 300 assigns the CD mode until the sum of the energy consumptions in the traveling sections to which the CD mode is assigned reaches a value larger than the remaining energy. When the sum of the energy consumptions in the traveling sections to which the CD mode is assigned is larger than the remaining energy, the HV-ECU 300 stops assigning the CD mode. When the HV-ECU 300 stops assigning the CD mode, the processes proceed to S114.

In S114, the HV-ECU 300 assigns the CS mode to any section to which the CD mode is not assigned. The HV-ECU 300 assigns the CS mode to a traveling section to which the CD mode is not assigned. By assigning the CD mode or the CS mode to each of the traveling sections, a traveling schedule is created. By switching the control modes in accordance with the traveling schedule, the SOC of the power storage device 100 can fall within the predetermined range when the vehicle 1 arrives at the destination. Thus, the power storage amount of the power storage device 100 can be used up without overage or shortage.

In S116, the HV-ECU 300 executes the mode switching control in accordance with the set traveling schedule. When the flag indicating that the switching control is being executed in accordance with the traveling schedule is OFF, the HV-ECU 300 turns ON the flag. When the HV-ECU 300 executes the switching control, the processes proceed to S122.

In S118, the HV-ECU 300 assigns the CD mode to all the traveling sections. When the HV-ECU 300 assigns the CD mode to all the traveling sections, the processes proceed to S120.

In S120, the HV-ECU 300 executes the mode switching control in accordance with the set traveling schedule. When the HV-ECU 300 executes the switching control, the processes proceed to S138.

In S122, the HV-ECU 300 determines whether the assistance execution record is not present. For example, the HV-ECU 300 determines that the assistance execution record is not present when the record flag is OFF. When the HV-ECU 300 determines that the assistance execution record is not present ("NO" in S122), the processes proceed to S124.

In S124, the HV-ECU 300 sets an unassisted remaining battery charge level. The unassisted remaining battery charge level indicates electric energy available in the power storage device 100 while the CD mode is selected in a case where the mode switching control is not executed in accordance with the traveling schedule. For example, the HV-ECU 300 sets the unassisted remaining battery charge level by using the SOC of the power storage device 100. Since the method for calculating the SOC of the power storage device 100 is described above, details of the method are not described again. For example, the HV-ECU 300 sets, as the unassisted remaining battery charge level, electric energy corresponding to a value obtained by subtracting a predetermined value from a value indicating a current SOC of the power storage device 100. For example, the predetermined value may be the threshold of the SOC for switching the CD mode to the CS mode, or a value obtained by adding a preset value to or subtracting the preset value from the threshold. When the HV-ECU 300 sets the unassisted remaining battery charge level, the processes proceed to S126.

In S126, the HV-ECU 300 sets the assistance execution record to be present. Specifically, the HV-ECU 300 turns ON the record flag. When the HV-ECU 300 sets the assistance execution record to be present, the processes proceed to S128. When the HV-ECU 300 determines in S122 that the assistance execution record is present ("YES" in S122), the processes proceed to S128.

In S128, the HV-ECU 300 determines whether the CD mode is selected and the engine 14 is not operating. The HV-ECU 300 determines whether the CD mode is selected by reading information on the set control mode from the memory 302. The HV-ECU 300 determines whether the engine 14 is not operating based on control conditions on the engine 14 (for example, a rotation speed of the output shaft of the engine 14 (engine speed) and a command value for the fuel injection amount). For example, the HV-ECU 300 determines that the engine 14 is not operating when the engine speed is equal to or lower than a threshold or the command value is equal to or lower than a threshold. When the HV-ECU 300 determines that the CD mode is selected and the engine 14 is not operating ("YES" in S128), the processes proceed to S130.

In S130, the HV-ECU 300 determines whether the unassisted remaining battery charge level is larger than "0". When the HV-ECU 300 determines that the unassisted remaining battery charge level is larger than "0" ("YES" in S130), the processes proceed to S132.

In S132, the HV-ECU 300 calculates an unassisted EV traveling distance (current value). Specifically, the HV-ECU 300 calculates the unassisted EV traveling distance (current value) by adding a moving distance in the predetermined control period to an unassisted EV traveling distance (previous value). For example, the HV-ECU 300 calculates the moving distance in the predetermined control period by using the predetermined control period and a vehicle speed. The HV-ECU 300 may calculate the moving distance in the predetermined control period by using a current vehicle speed detected by the vehicle speed sensor, or by using an average of vehicle speeds in the predetermined control period.

In S134, the HV-ECU 300 calculates an unassisted remaining battery charge level (current value). The HV-ECU 300 estimates, as the unassisted remaining battery charge level (current value), a remaining charge level of the power storage device 100 based on a change amount of the SOC of the power storage device 100 in the predetermined control period in the case where the switching control is not executed.

Specifically, the HV-ECU 300 calculates the unassisted remaining battery charge level (current value) by subtracting electric energy corresponding to a traveling consumption in the predetermined control period and electric energy corresponding to an auxiliary device consumption in the predetermined control period from an unassisted remaining battery charge level (previous value). The HV-ECU 300 updates the value of the unassisted remaining battery charge level stored in the memory 302 by using the calculated unassisted remaining battery charge level (current value).

For example, the HV-ECU 300 calculates energy actually consumed by the second MG 12 in the predetermined control period (traveling energy consumption) as the traveling consumption. For example, the HV-ECU 300 may calculate, as the traveling consumption, a traveling energy consumption that is based on a current or voltage supplied to the second MG 12. The HV-ECU 300 calculates the traveling energy consumption by setting a maximum value of output energy of the second MG 12 as a maximum value of the traveling energy consumption.

For example, the HV-ECU 300 calculates energy actually consumed by the auxiliary devices of the vehicle 1 in the predetermined control period (auxiliary device energy consumption) as the auxiliary device consumption. For example, the auxiliary devices of the vehicle 1 include at least one of the air conditioner (electric devices such as the compressor), various cooling fans (electric devices such as a cooler of the power storage device 100), and various power converters such as the DC/DC converter. For example, the HV-ECU 300 may calculate, as the auxiliary device consumption, an auxiliary device energy consumption that is based on a current or voltage flowing through each of the auxiliary devices. When the HV-ECU 300 calculates the unassisted remaining battery charge level (current value), the processes proceed to S136. When the HV-ECU 300 determines in S130 that the unassisted remaining battery charge level is equal to or smaller than "0" ("NO" in S130), the processes proceed to S136.

In S136, the HV-ECU 300 calculates an assisted EV traveling distance (current value) by adding the moving distance in the predetermined control period to an assisted EV traveling distance (previous value). For example, the HV-ECU 300 calculates the moving distance in the predetermined control period by using the predetermined control period and the vehicle speed. Since the method for calculating the moving distance is described above, details of the method are not described again. When the HV-ECU 300 calculates the assisted EV traveling distance (current value), the processes proceed to S138. When the HV-ECU 300 determines in S128 that the CD mode is not selected or the engine 14 is operating ("NO" in S128), the processes proceed to S138. That is, the HV-ECU 300 does not execute the processes of calculating the unassisted EV traveling distance (current value) and the assisted EV traveling distance (current value) by adding the moving distance in the predetermined control period to the unassisted EV traveling distance (previous value) and the assisted EV traveling distance (previous value).

In S138, the HV-ECU 300 determines whether a control termination condition is satisfied. Examples of the control termination condition include a condition that the vehicle 1 arrives at the destination. For example, the HV-ECU 300 determines that the vehicle 1 arrives at the destination when the current position of the vehicle 1 received from the navigation ECU 350 falls within a predetermined range including the destination. Examples of the control termination condition further include a condition that the vehicle 1 has an abnormality. When the HV-ECU 300 determines that the control termination condition is satisfied ("YES" in S138), the processes proceed to S140. When the HV-ECU 300 determines that the control termination condition is not satisfied ("NO" in S138), the processes are terminated.

In S140, the HV-ECU 300 terminates the switching control in accordance with the traveling schedule. For example, when the flag indicating that the switching control is being executed in accordance with the traveling schedule is ON, the HV-ECU 300 turns OFF the flag. In S142, the HV-ECU 300 turns OFF the record flag.

Description is given of an example of the operations of the HV-ECU 300 mounted on the vehicle 1 of this embodiment based on the structure and flowchart described above.

For example, when the user performs an operation of activating the vehicle 1, the IG flag is turned ON ("YES" in S100). The HV-ECU 300 determines whether the assistance condition is satisfied (S102). The assistance condition is satisfied ("YES" in S102) when the user operates the HMI 330 to input a destination of the vehicle 1 and a traveling route is set. The HV-ECU 300 determines whether preview information is updated (S104). The HV-ECU 300 determines that the preview information is updated ("YES" in S104) when the navigation ECU 350 receives road traffic information to generate preview information associated with the set traveling route and the HV-ECU 300 receives the generated preview information from the navigation ECU 350. The HV-ECU 300 calculates energy consumptions En in a plurality of traveling sections on the traveling route based on the preview information, and calculates the sum of the energy consumptions En as a total energy consumption Esum (S106).

When the assistance execution record is not present (that is, the record flag is OFF) but the total energy consumption Esum is larger than the remaining energy Er ("YES" in S108), the HV-ECU 300 first assigns the CD mode to the CD mode priority sections (S110). The HV-ECU 300 assigns the CD mode to traveling sections other than the CD mode priority sections in ascending order of the energy consumption until the total energy consumption in the traveling sections to which the CD mode is assigned reaches a value larger than the remaining energy of the power storage device 100 (S112). The HV-ECU 300 assigns the CS mode to any traveling section to which the CD mode is not assigned (S114).

When the control modes are assigned to all the traveling sections and a traveling schedule associated with the traveling route is created, the HV-ECU 300 executes the control mode switching control in accordance with the traveling schedule (S116).

For example, it is assumed that the CD mode is selected in accordance with the traveling schedule during driving of the vehicle 1. Since the assistance execution record is not present ("NO" in S122), the HV-ECU 300 sets an unassisted remaining battery charge level (S124), and turns ON the record flag (S126).

When the CD mode is selected and the engine 14 is not operating ("YES" in S128) and the unassisted remaining battery charge level is larger than "0" ("YES" in S130), the HV-ECU 300 calculates an unassisted EV traveling distance (current value) by adding a moving distance after a previous calculation timing to an unassisted EV traveling distance (previous value) (S132), and calculates an unassisted remaining battery charge level (current value) by subtracting a traveling consumption and an auxiliary device consumption from an unassisted remaining battery charge level (previous value) (S134).

The HV-ECU 300 calculates an assisted EV traveling distance (current value) by adding the moving distance after the previous calculation timing to an assisted EV traveling distance (previous value) (S136). The switching control is continued as long as the control termination condition is not satisfied as in a case where the vehicle 1 has not arrived at the destination ("NO" in S138). Until the unassisted remaining battery charge level reaches a value equal to or smaller than "0", the unassisted EV traveling distance is calculated (S132), the unassisted remaining battery charge level is calculated based on the traveling consumption and the auxiliary device consumption (S134), and the assisted EV traveling distance (current value) is calculated (S136).

When the CD mode is selected and the engine 14 is operating ("NO" in S128), the HV-ECU 300 calculates neither the unassisted EV traveling distance nor the assisted EV traveling distance. This configuration suppresses addition of the moving distance during the operation of the engine 14 to the unassisted EV traveling distance and the assisted EV traveling distance.

Figure 4:
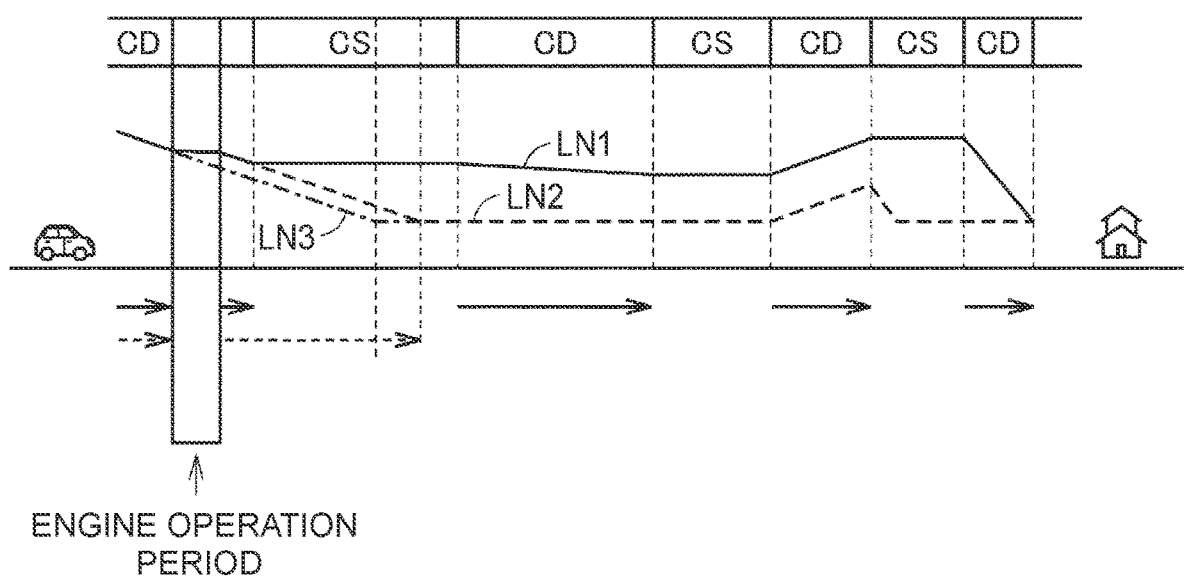
FIG. 4 is a diagram for describing operations of the HV-ECU.

FIG. 4 is a diagram for describing the operations of the HV-ECU 300. In FIG. 4, a horizontal axis represents a moving distance of the vehicle 1. In FIG. 4, LN1 (continuous line) indicates a change in the SOC in the case where the control mode switching control is executed in accordance with the traveling schedule. In FIG. 4, LN2 (dashed line) indicates a change in the SOC in the case where the control mode switching control is not executed in accordance with the traveling schedule. An upper part of FIG. 4 illustrates traveling sections and control modes set in the traveling sections. In FIG. 4, LN3 (long dashed short dashed line) indicates a change in an estimated value of the SOC in the case where the moving distance during the operation of the engine 14 is not added.

As indicated by LN1 in FIG. 4, the SOC of the vehicle 1 decreases when the CD mode is selected in accordance with the traveling schedule and the vehicle 1 is driven by using the electric power stored in the power storage device 100. The SOC of the vehicle 1 increases when the CD mode is selected and regenerative braking is executed because the vehicle 1 travels along, for example, a downslope. The SOC of the power storage device 100 is kept when the CS mode is selected in accordance with the traveling schedule. By switching the control modes in accordance with the traveling schedule, the SOC of the power storage device 100 falls within the predetermined range when the vehicle 1 arrives at the destination.

As indicated by LN2 in FIG. 4, the CD mode is continuously selected in the case where the switching control is not executed in accordance with the traveling schedule. The CS mode is selected when the SOC decreases to the threshold for switching to the CS mode. After the CS mode is selected, the CS mode is kept until the vehicle 1 arrives at the destination. When the CS mode is selected and the vehicle 1 travels along a downslope, regenerative braking may be executed to increase the SOC of the vehicle 1.

When the control mode switching control is executed in accordance with the traveling schedule, an increase in the energy consumption in the second MG 12 is suppressed by, for example, selecting the CS mode in a traveling section having a relatively high traveling load. Thus, the traveling distance of the motor-based traveling in the state in which the engine 14 is stopped can be increased as compared to the case where the control mode switching control is not executed in accordance with the traveling schedule.

During an operation period in which the engine 14 is operating in the CD mode, a decrease in the actual SOC of the power storage device 100 is suppressed through the operation of the engine 14. As indicated by LN3 in FIG. 4, when the traveling distance using the electric power in the power storage device 100 is calculated under the assumption that the SOC of the power storage device 100 decreases in the engine operation period, the calculated traveling distance may deviate from the actual traveling distance of the motor-based traveling using the electric power in the power storage device 100.

When the moving distance during the operation period in which the CD mode is selected and the engine 14 is operating is not added to the assisted EV traveling distance as indicated by LN1 and LN2 in FIG. 4, the assisted EV traveling distance and the unassisted EV traveling distance can be calculated with high accuracy.

When the control termination condition is satisfied ("YES" in S138), the control mode switching control is terminated (S140), and the record flag is turned OFF (S142).

For example, when a difference ΔD between the assisted EV traveling distance and the unassisted EV traveling distance is calculated, the user can be notified by using the HMI 330 as illustrated in FIG. 2 about information indicating the traveling distance increased by executing the switching control in accordance with the traveling schedule.

When the record flag is OFF and the total energy consumption Esum is equal to or smaller than the remaining energy Er in the power storage device 100 ("NO" in S108), the CD mode is assigned to all the traveling sections on the traveling route (S118), and the control mode switching control is executed in accordance with the traveling schedule (S120). In this case, the CD mode is continuously selected until the vehicle 1 arrives at the destination irrespective of whether the control mode switching control is executed in accordance with the traveling schedule.

In the hybrid vehicle according to this embodiment described above, the unassisted EV traveling distance of the motor-based traveling using the electric power in the power storage device 100 in the case where the switching control is not executed and the assisted EV traveling distance of the motor-based traveling using the electric power in the power storage device 100 in the case where the switching control is executed can be calculated with high accuracy. Thus, it is possible to provide a hybrid vehicle in which the traveling distances of the motor-based traveling using the electric power in the on-board battery in the case where the switching control is executed depending on the traveling condition and in the case where the switching control is not executed are calculated with high accuracy.

The traveling distance of the motor-based traveling when the CD mode is selected and the engine 14 is operating is not added to each of the unassisted EV traveling distance and the assisted EV traveling distance. Thus, the unassisted EV traveling distance and the assisted EV traveling distance can be calculated with high accuracy.

During the execution of the switching control, the unassisted remaining battery charge level is calculated by using the auxiliary device energy consumption in addition to the traveling energy consumption. Thus, the unassisted remaining battery charge level can be calculated with high accuracy.

The unassisted remaining battery charge level is calculated by setting the maximum value of the output energy of the second MG 12 as the maximum value of the traveling energy consumption. Thus, the unassisted remaining battery charge level can be calculated with high accuracy.

The user is notified by using a notifier such as the HMI 330 about the information related to the assisted EV traveling distance (for example, information related to the difference between the unassisted EV traveling distance and the assisted EV traveling distance). Thus, the user can recognize the effect of the execution of the control mode switching control in accordance with the traveling schedule.

The user is notified by using the HMI 330 about the information related to the difference between the unassisted EV traveling distance and the assisted EV traveling distance. Thus, the user can recognize the effect of the execution of the control mode switching control in accordance with the traveling schedule.

The traveling distance that is obtained when the state in which the engine 14 is not operating and the unassisted remaining battery charge level of the power storage device 100 is higher than the threshold (zero) while the CD mode is selected continues is added to the unassisted EV traveling distance. Thus, the unassisted EV traveling distance can be calculated with high accuracy.

Modified examples are described below. In the embodiment described above, the vehicle 1 is, for example, the series-parallel hybrid vehicle, but may be any other type of hybrid vehicle such as a series hybrid vehicle as long as at least the CD mode and the CS mode can be set in the hybrid vehicle.

In the embodiment described above, the control modes include the CD mode and the CS mode, but may include a mode other than the CD mode and the CS mode. Examples of the control mode include a mode in which the operation of the engine 14 is prohibited.

In the embodiment described above, the remaining energy Er is the energy corresponding to the electric energy required until the current SOC of the power storage device 100 falls within the predetermined range, but may be a value obtained by adding a predetermined margin to the energy.

In the embodiment described above, the unassisted remaining battery charge level (current value) is calculated by subtracting the traveling consumption and the auxiliary device consumption from the unassisted remaining battery charge level (previous value). When the auxiliary device consumption is small (the auxiliary device such as the air conditioner is not operating), the unassisted remaining battery charge level (current value) may be calculated by subtracting only the traveling consumption from the unassisted remaining battery charge level (previous value). Thus, the unassisted remaining battery charge level can be calculated with high accuracy.

In the embodiment described above, the display contents illustrated in FIG. 2 are displayed on the HMI 330, but may be displayed on a display of a mobile terminal of the user in place of or in addition to the HMI 330.

In the embodiment described above, the information related to the difference between the unassisted EV traveling distance and the assisted EV traveling distance is output to the HMI 330 with the display contents illustrated in FIG. 2, but may be output to, for example, a server provided outside the vehicle 1.

Figure 5:
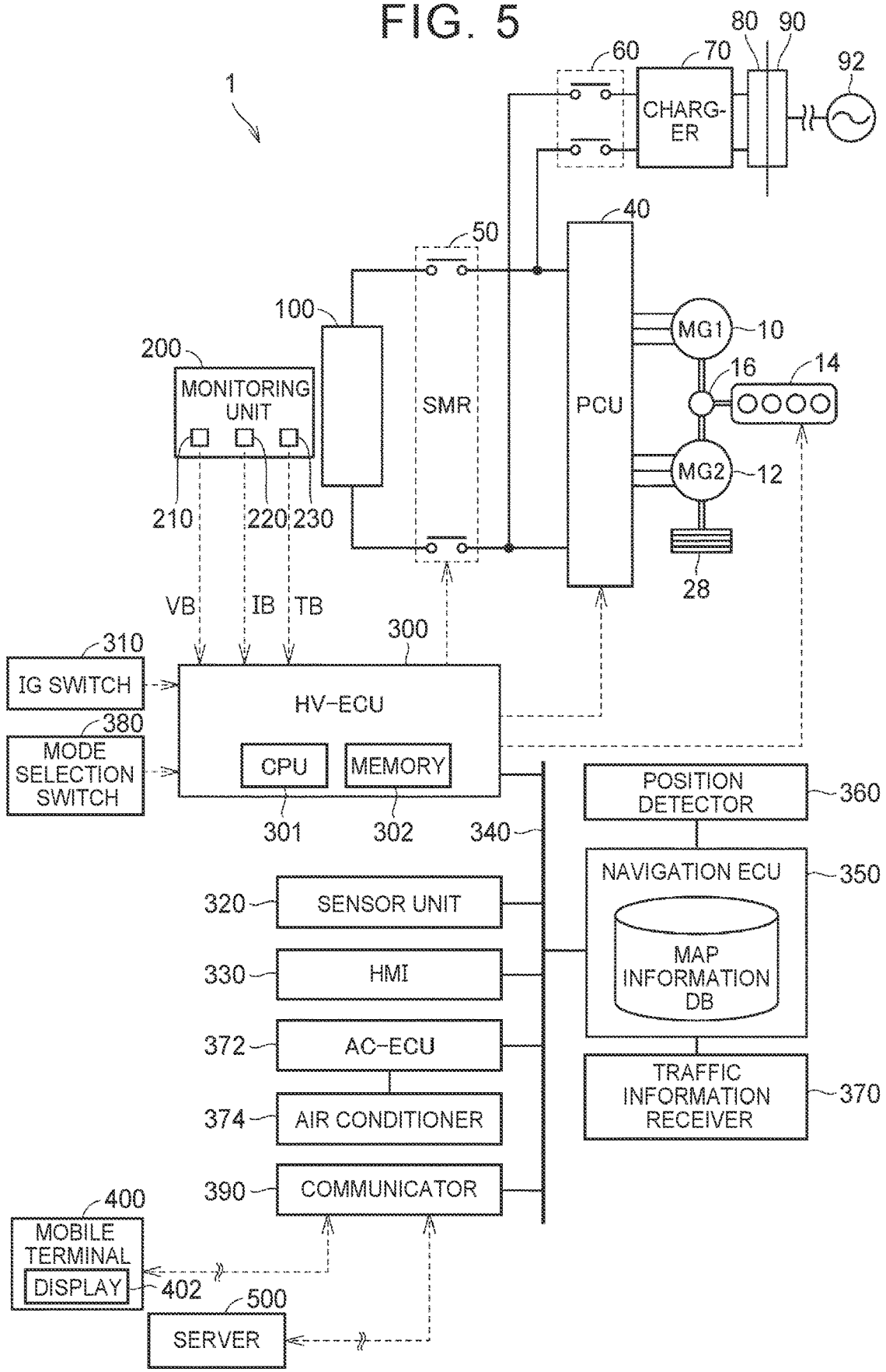
FIG. 5 is a diagram illustrating an example of the configuration of a hybrid vehicle in a modified example.

FIG. 5 is a diagram illustrating an example of the configuration of a hybrid vehicle in a modified example. A vehicle 1 illustrated in FIG. 5 differs from the vehicle 1 illustrated in FIG. 1 in that the vehicle 1 includes a communicator 390 communicable with at least one of a mobile terminal 400 of the user and a server 500 provided outside the vehicle 1. Components of the vehicle 1 other than the communicator 390 in FIG. 5 are similar to the components of the vehicle 1 illustrated in FIG. 1. Therefore, details of the components are not described again.

As illustrated in FIG. 5, the vehicle 1 further includes the communicator 390. The communicator 390 is communicable with at least one of the mobile terminal 400 of the user of the vehicle 1 and the server 500 provided outside the vehicle 1.

For example, the communicator 390 and the mobile terminal 400 may communicably be connected through predetermined close-proximity wireless communication achieved by pairing in advance, through wireless communication using a wireless local area network (LAN) via a base station (not illustrated), or directly by wire. The mobile terminal 400 includes a display 402. The display 402 can display information received from the communicator 390 in a predetermined format. The HV-ECU 300 may transmit information for displaying the display contents illustrated in FIG. 2 to the mobile terminal 400 via the communicator 390, and the mobile terminal 400 may cause the display 402 to display the information received from the communicator 390. In this manner as well, the user can recognize the effect of the execution of the control mode switching control in accordance with the traveling schedule.

For example, the communicator 390 and the server 500 may communicably be connected through wireless communication using a wireless LAN via a base station (not illustrated). When the vehicle 1 is traveling or arrives at a destination, the HV-ECU 300 transmits, to the server 500 via the communicator 390, information related to the unassisted EV traveling distance and the assisted EV traveling distance together with information for identifying the vehicle 1. The server 500 includes a database (not illustrated) that stores the information related to the unassisted EV traveling distance and the assisted EV traveling distance in association with the information for identifying the vehicle 1. The database may further store information on vehicles other than the vehicle 1.

With this configuration, the server 500 can acquire information indicating the effect of the execution of the switching control in the vehicle 1.

In the embodiment described above, the unassisted EV traveling distance and the assisted EV traveling distance are calculated only when the CD mode is selected and the engine 14 is not operating. The unassisted EV traveling distance and the assisted EV traveling distance may be calculated not only when the CD mode is selected and the engine 14 is not operating but also when the CS mode is selected and the engine 14 is not operating.

Figure 6A:
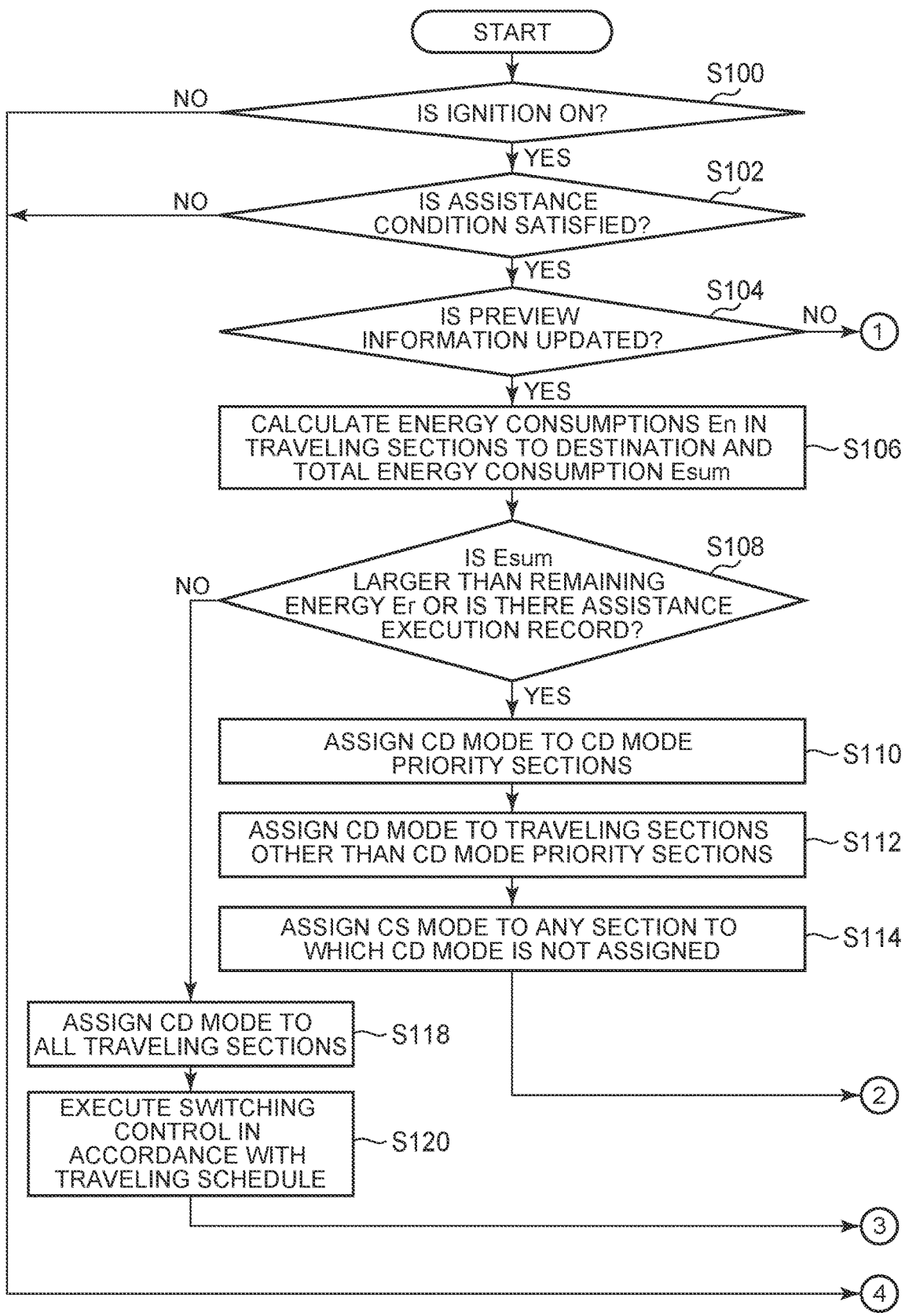
FIG. 6A is a flowchart illustrating an example of processes to be executed by an HV-ECU in the modified example.

FIGS. 6A and 6B are flowcharts illustrating an example of processes to be executed by the HV-ECU 300 in a modified example.

The processes in the flowcharts of FIGS. 6A and 6B differ from the processes in the flowchart of FIG. 4 in that a process of S200 is executed in place of the process of S128 in the flowchart of FIG. 4. Processes other than that of S200 of FIGS. 6A and 6B are identical to the processes other than that of S128 of FIG. 4 except for a case described below, and the same step numbers are assigned. Therefore, details of those processes are not described again.

As illustrated in FIGS. 6A and 6B, when the record flag is turned ON (S126) or the HV-ECU 300 determines that the assistance execution record is present ("YES" in S122), the processes proceed to S200.

In S200, the HV-ECU 300 determines whether the CD mode or the CS mode is selected and the engine 14 is not operating. When the CD mode is selected and the engine 14 is not operating or the CS mode is selected and the engine 14 is not operating ("YES" in S200), the processes proceed to S130. When the CD mode or the CS mode is selected and the engine 14 is operating ("NO" in S200), the processes proceed to S138.

When the engine 14 is operating in the CD mode, addition of a moving distance during an operation period of the engine 14 to the unassisted EV traveling distance and the assisted EV traveling distance is suppressed. When the engine 14 is not operating in the CS mode, a moving distance during a non-operation period of the engine 14 is added to the unassisted EV traveling distance and the assisted EV traveling distance. As a result, the traveling distances of the motor-based traveling using the electric power in the power storage device 100 can be calculated with high accuracy.

All or part of the modified examples may be combined as appropriate. It should be understood that the embodiment disclosed herein is illustrative but is not limitative in all respects. The scope of the present disclosure is defined by the claims rather than the above description, and is intended to encompass meanings of equivalents to the elements in the claims and all modifications within the scope of the claims.

What is claimed is:

1. A hybrid vehicle comprising:
   an electric motor configured to generate a driving force in the hybrid vehicle;
   a power storage device configured to supply electric power to the electric motor;
   an engine configured to generate electric power for charging the power storage device; and
   a controller configured to control the engine and the electric motor in any one of a plurality of control modes, the control modes including a charge depleting mode and a charge sustaining mode, the controller being configured to
   execute switching control for switching the control modes in accordance with a traveling schedule in which the charge depleting mode or the charge sustaining mode is assigned to each of a plurality of sections that constitutes a traveling route to a destination of the hybrid vehicle,
   calculate a first traveling distance and a second traveling distance, the first traveling distance being a traveling distance of motor-based traveling using the electric power in the power storage device in a case where the switching control is not executed, the second traveling distance being a traveling distance of the motor-based traveling using the electric power in the power storage device in a case where the switching control is executed,
   add, to the first traveling distance, a traveling distance that is obtained when a state in which the engine is not operating and a power storage amount of the power storage device is higher than a threshold continues, and
   add, to the second traveling distance, a traveling distance that is obtained when a state in which the engine is not operating and the charge depleting mode is selected continues.

2. The hybrid vehicle according to claim 1, wherein the controller is configured not to add, to each of the first traveling distance and the second traveling distance, a traveling distance of the motor-based traveling during a period in which the charge depleting mode is selected and the engine is operating.

3. The hybrid vehicle according to claim 1, wherein the controller is configured to calculate, during execution of the switching control, the power storage amount in the case where the switching control is not executed by using an energy consumption caused by traveling of the hybrid vehicle.

4. The hybrid vehicle according to claim 1, wherein the controller is configured to calculate, during execution of the switching control, the power storage amount in the case where the switching control is not executed by using an energy consumption caused by traveling of the hybrid vehicle and an energy consumption caused by operation of an auxiliary device of the hybrid vehicle.

5. The hybrid vehicle according to claim 1, wherein the controller is configured to calculate the power storage amount in the case where the switching control is not executed by setting a maximum value of output energy of the electric motor as a maximum value of an energy consumption caused by traveling of the hybrid vehicle.

6. The hybrid vehicle according to claim 1, wherein the controller is configured to notify, by using a notifier, a user about information related to the second traveling distance.

7. The hybrid vehicle according to claim 6, wherein the information related to the second traveling distance includes information related to a difference between the first traveling distance and the second traveling distance.

8. The hybrid vehicle according to claim 6, wherein the notifier includes at least one of a display provided in the hybrid vehicle and a display of a mobile terminal.

9. The hybrid vehicle according to claim 1, further comprising a communicator configured to communicate with a server outside the hybrid vehicle, wherein the controller is configured to transmit information related to the first traveling distance and the second traveling distance to the server by using the communicator.

10. The hybrid vehicle according to claim 1, wherein the controller is configured to add, to the first traveling distance, the traveling distance that is obtained when the state in which the engine is not operating and the power storage amount of the power storage device is higher than the threshold while the charge depleting mode is selected continues.

* * * * *